United States Patent [19]
Hu

[11] Patent Number: 5,865,451
[45] Date of Patent: Feb. 2, 1999

[54] ANGULAR AUTO-ADJUSTIVE SKID-PROOF PAD SYSTEM ON A BABY STROLLER

[76] Inventor: Stephen Hu, No 2, Ta-Tung Road, Hsin-Chu Industrial Park, Taiwan

[21] Appl. No.: 965,292

[22] Filed: Nov. 6, 1997

[51] Int. Cl.⁶ ..................................................... B62B 7/00
[52] U.S. Cl. .................................. 280/87.051; 280/47.38; 280/87.041
[58] Field of Search .................... 280/87.051, 87.041, 280/87.042, 33.994, 47.34; 188/5, 20, 32; 403/329, 388, 386; 24/324, 662; 293/155, 128

[56] References Cited

U.S. PATENT DOCUMENTS

| | | | |
|---|---|---|---|
| 412,199 | 10/1889 | McIlhenny | 182/109 |
| 4,699,392 | 10/1987 | Ku | 280/87.02 |
| 5,366,231 | 11/1994 | Hung | 280/87.051 |
| 5,462,300 | 10/1995 | Chien | 280/87.051 |
| 5,560,626 | 10/1996 | Glazer et al. | 280/33.994 |
| 5,697,669 | 12/1997 | Yemini | 297/188.1 |
| 5,732,961 | 3/1998 | Theodoropoulos | 280/87.051 |

*Primary Examiner*—J. J. Swann
*Assistant Examiner*—Andrew J. Fischer
*Attorney, Agent, or Firm*—Pro-Techtor International Services

[57] ABSTRACT

An angular auto-adjustive skid-proof pad system on a baby stroller, which system is provided on the bottom of the chassis of the baby stroller with a plurality of skid-proof pad seats which are provided thereon with a plurality of skid-proof pads of the shapes of undulated plates, and are provided on either side thereof with a protruding axle for engaging an axle hole provided each on a side plate on the chassis, the skid-proof pad seats can thus be adjusted in angular positions in the axle holes; thereby, when the rollers of the baby stroller rush out inadvertently into a stair way and are suspended in the air, the skid-proof pads can provide a braking function and prevent the baby stroller from falling down.

6 Claims, 7 Drawing Sheets

ANGULAR AUTO-ADJUSTIVE SKID-PROOF PAD SYSTEM ON A BABY STROLLER

BACKGROUND OF THE INVENTION

1. Field of the Invention

The present invention is related to an angular auto-adjustive skid-proof pad system on a baby stroller, and especially to such a baby stroller having on the bottom of the chassis thereof a structure of which pads can be automatically adjusted in tilting angles thereof in pursuance of the tilting angle of a ground surface they touch.

2. Description of the Prior Art

A conventional baby stroller is subjected to falling down stairs when it is used at a place near the stairs, the baby sitting in the baby stroller therefore may be inadvertently hurt; hence the manufacturers are hurrying to study and develop a skid-proof or braking structure to prevent from such falling-down and from repeated occurrence of such tragedies.

There has been a baby stroller with skid-proof pads provided on the bottom of the chassis for the purpose of: preventing the baby stroller from further falling down by friction force of the skid-proof pads when the rollers of the baby stroller rush out into a stair way. However, such skid-proof pads are not effective, the reason is that when one roller of the baby stroller rushes out and is suspended in the air, the chassis is tilted, and evidently, the skid-proof pads mounted thereon are tilted too, in this way, contact between the skid-proof pads and the ground is not in a plane, rather, it is in a line, friction force hence is not adequate to assure prevention of further falling down of the baby stroller.

SUMMARY OF THE INVENTION

Accordingly, the object of the present invention is to provide a baby stroller having a structure of which a plurality of skid-proof pads on the bottom of the chassis of the baby stroller can be automatically adjusted in tilting angles thereof, when the rollers of the baby stroller rushed out into a stair way and is suspended in the air, even if the skid-proof pads mounted thereon are tilted, the auto-sensitive skid-proof pads still can be automatically adjusted in tilting angles and can be constantly parallel to the ground surface, therefore, contact between the skid-proof pads and the ground is in a plane, friction force hence is adequate to assure prevention of further falling down of the baby stroller.

The present invention will be apparent in construction of its structure and functions thereof after reading the detailed description of the preferred embodiment of the present invention in reference to the accompanying drawings.

DETAILED DESCRIPTION OF THE PREFERRED EMBODIMENT

Figure 1:
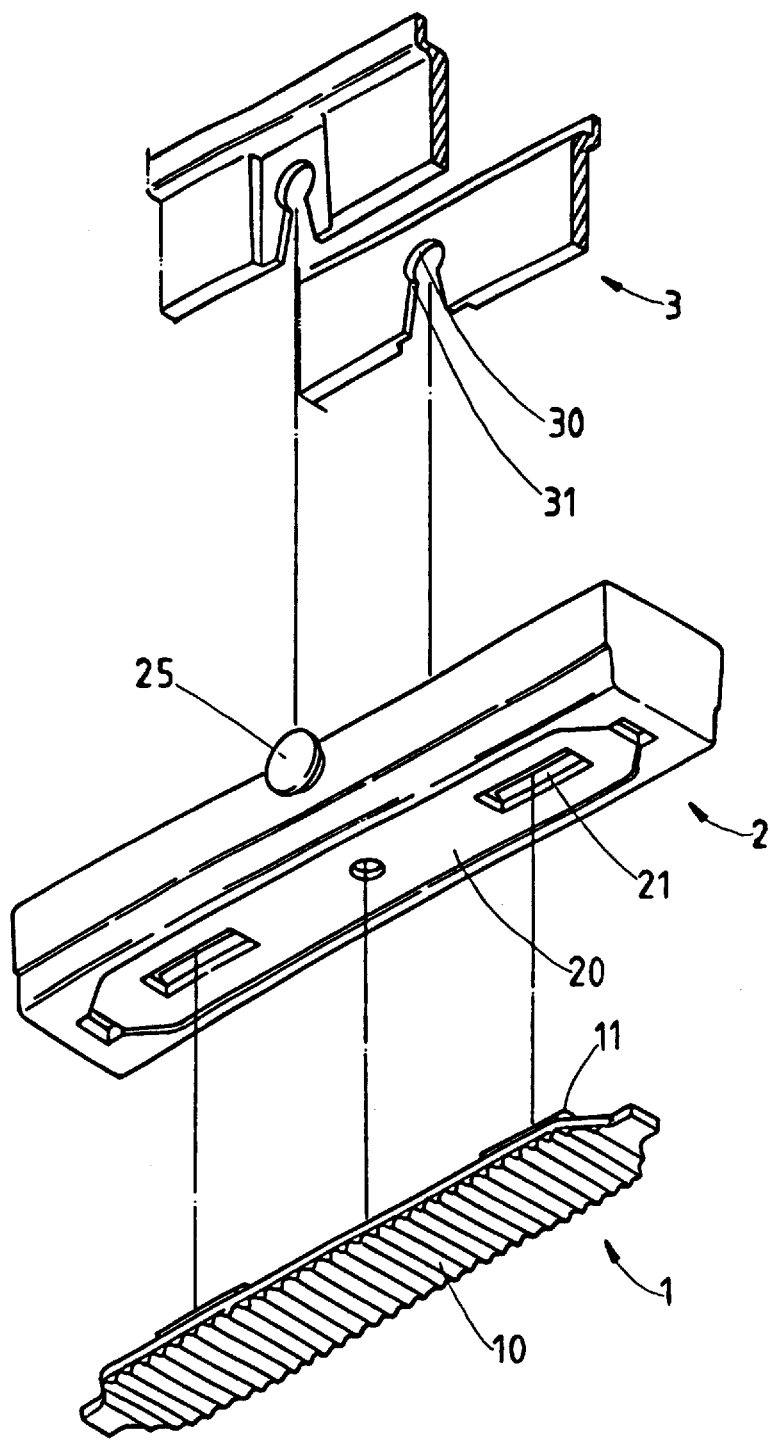
FIG. 1 is an analytic perspective view of the present invention.
Figure 2:
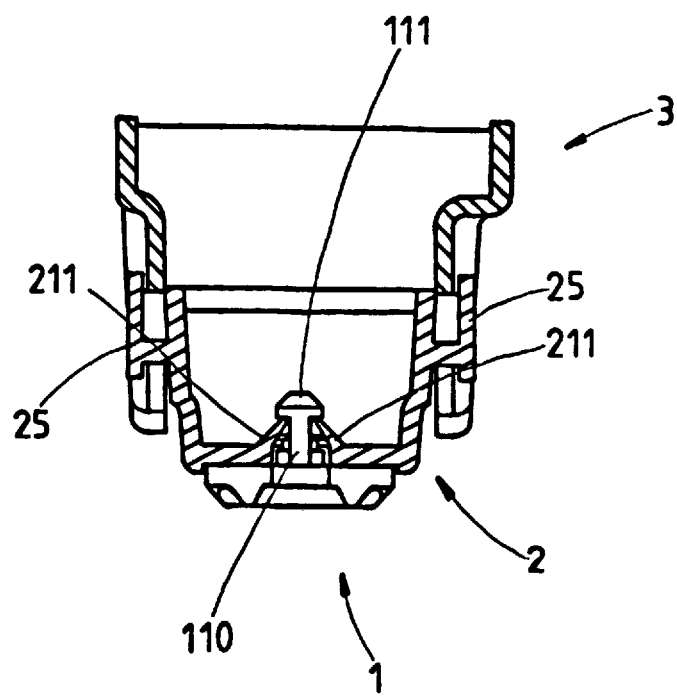
FIG. 2 is a schematic sectional view showing construction of the present invention.

Referring firstly to FIG. 1 and 2 of the drawings, the present invention is comprised of: a plurality of skid-proof pads 1, a plurality of skid-proof pad seats 2 and pairs of side plates 3, wherein, each skid-proof pad 1 is integrally assembled on a skid-proof pad seat 2, while the side plates 3 are provided for mounting and positioning and adjusting of angular positions of the skid-proof pad seats 2.

Each skid-proof pad 1 is made of soft material providing skid-proof effect, the function thereof is to obtain the skid-proof effect by friction force induced by contact thereof with the ground, there is an undulated plate 10 on the surface thereof, the bottom thereof is provided with a plurality of engaging members 11 protruding downwardly, the engaging members 11 each is comprised of an extension portion 110 and an enlarged end 111.

Each skid-proof pad seat 2 is provided thereon with a groove 20 for receiving a skid-proof pad 1, the groove 20 is provided with a plurality of engaging slots 21 for engagement of the engaging members 11 of the skid-proof pad 1, such as is shown in FIG. 2, the engaging slots 21 each is provided with two opposite stop pieces 211 which have a gap therebetween, when the enlarged end 111 at the lower end of the skid-proof pad 1 is inserted into the gap between the stop pieces 211, the skid-proof pad 1 can be engaged with the skid-proof pad seat 2; and the skid-proof pad seat 2 is provided on either side thereof mutually oppositely with a protruding axle 25.

Figure 3:
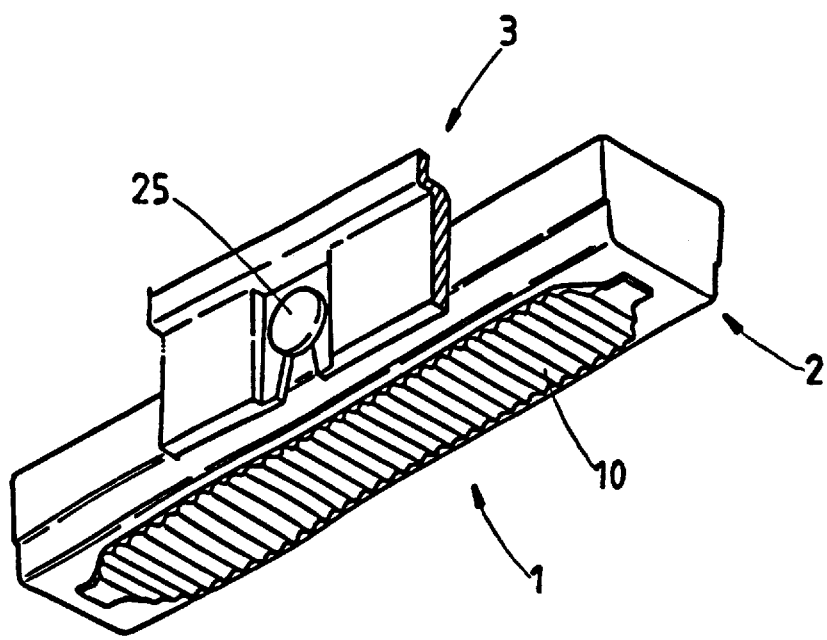
FIG. 3 is a perspective view of the appearance of the present invention.

The side plates 3 are provided thereon each with an axle hole 30 which is provided on the top thereof with a reduced engaging neck 31, the protruding axles 25 of the skid-proof pad seat 2 can be placed in the axle holes 30 and are not to be moved out by locking of the reduced engaging necks 31 (as shown in FIG. 3); putting the protruding axles 25 in the axle holes 30, the skid-proof pad seat 2 can be adjusted to any angular position between the side plates 3.

Figure 4:
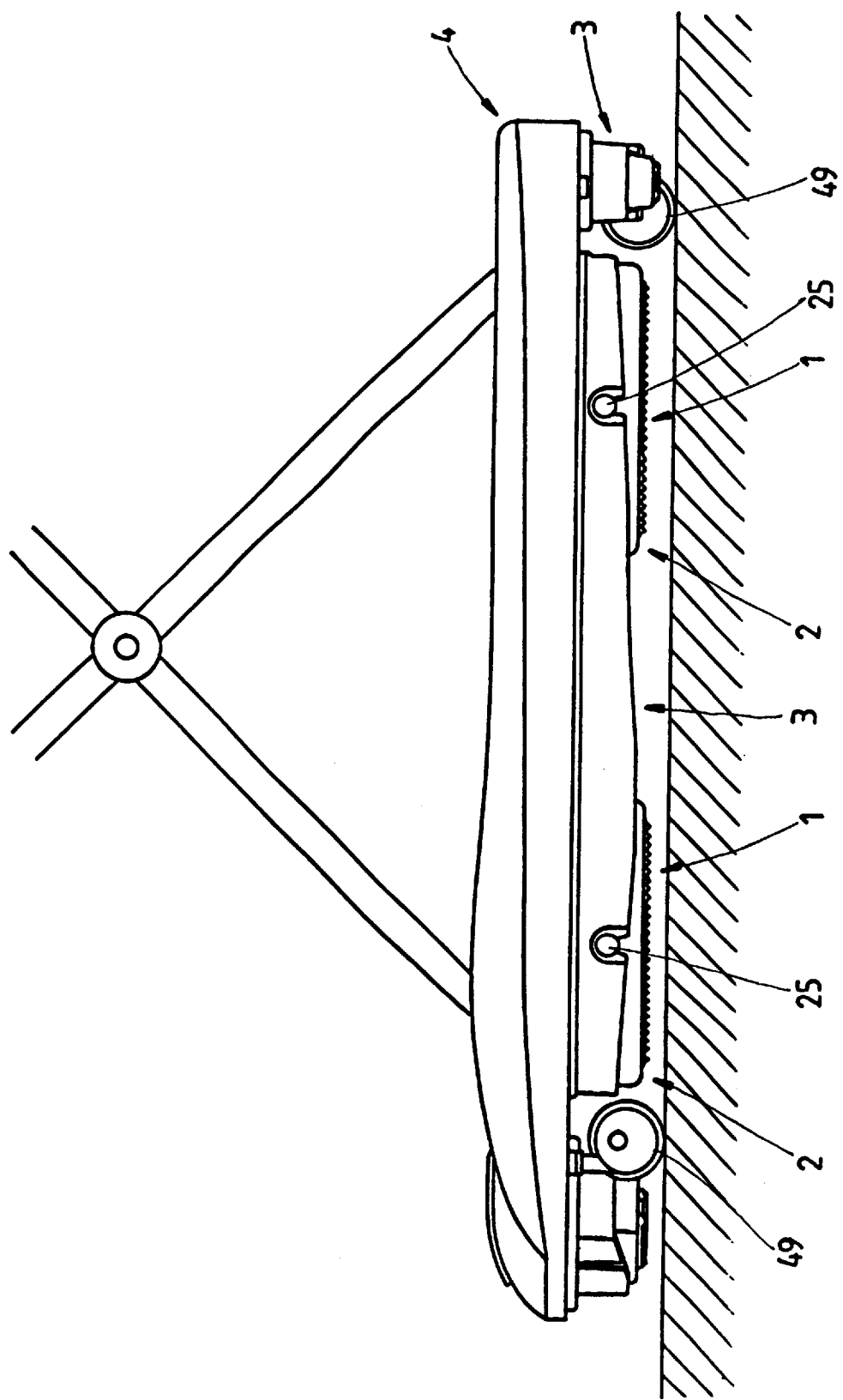
FIG. 4 is a side view showing an assembled embodiment of the present invention.
Figure 5:
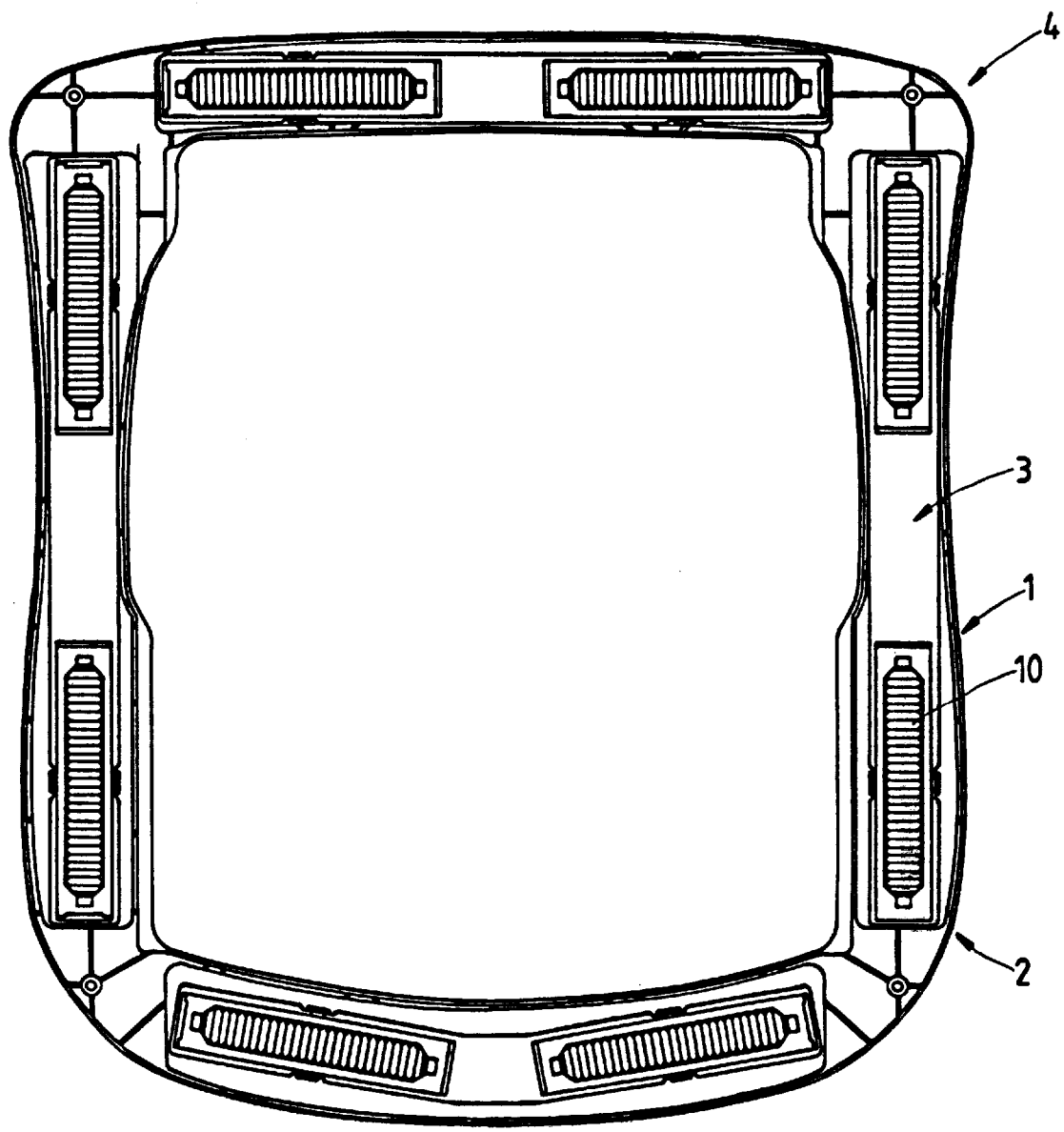
FIG. 5 is a bottom view showing the assembled embodiment of the present invention.

Referring to FIG. 4 and 5 which show an embodiment of the present invention mounted on a baby stroller, wherein the side plates 3 are provided integrally on the lower portion of the chassis 4.

Figure 6:
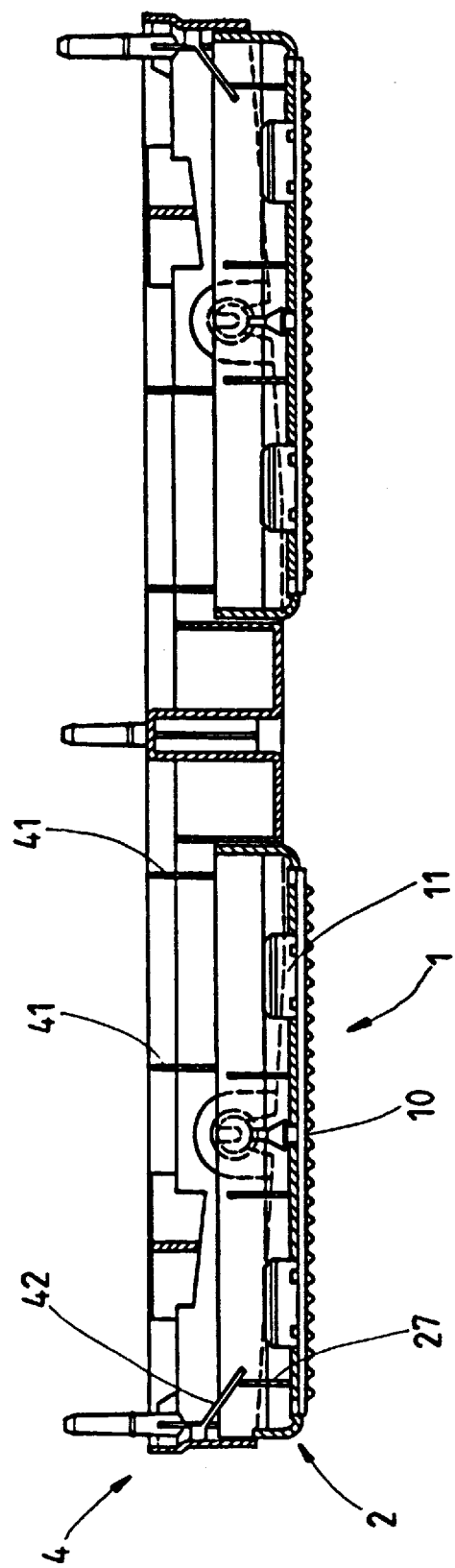
FIG. 6 is sectional view showing the structure of the present invention.

The skid-proof pad seat 2 is capable of random changing of its angular position by means of the protruding axles 25 and the axle holes 30, so that the skid-proof pad seat 2 is capable of maintaining in a parallel position to the ground surface normally. Referring to FIG. 6, a plurality of bracing sheets 41 and elastic sheets 42 are provided in the chassis 4, while the skid-proof pad seat 2 is also provided with a plurality of internal sheets 27, hence the skid-proof pad seat 2 can be maintained constantly in a parallel position to the ground normally by means of the bracing sheets 41 and elastic sheets 42; on the contrary, when the skid-proof pad seat 2 is tilted by virtue of an external force, the elastic sheets 42 will be bent and afterwards will be recovered when the force is removed.

Figure 7:
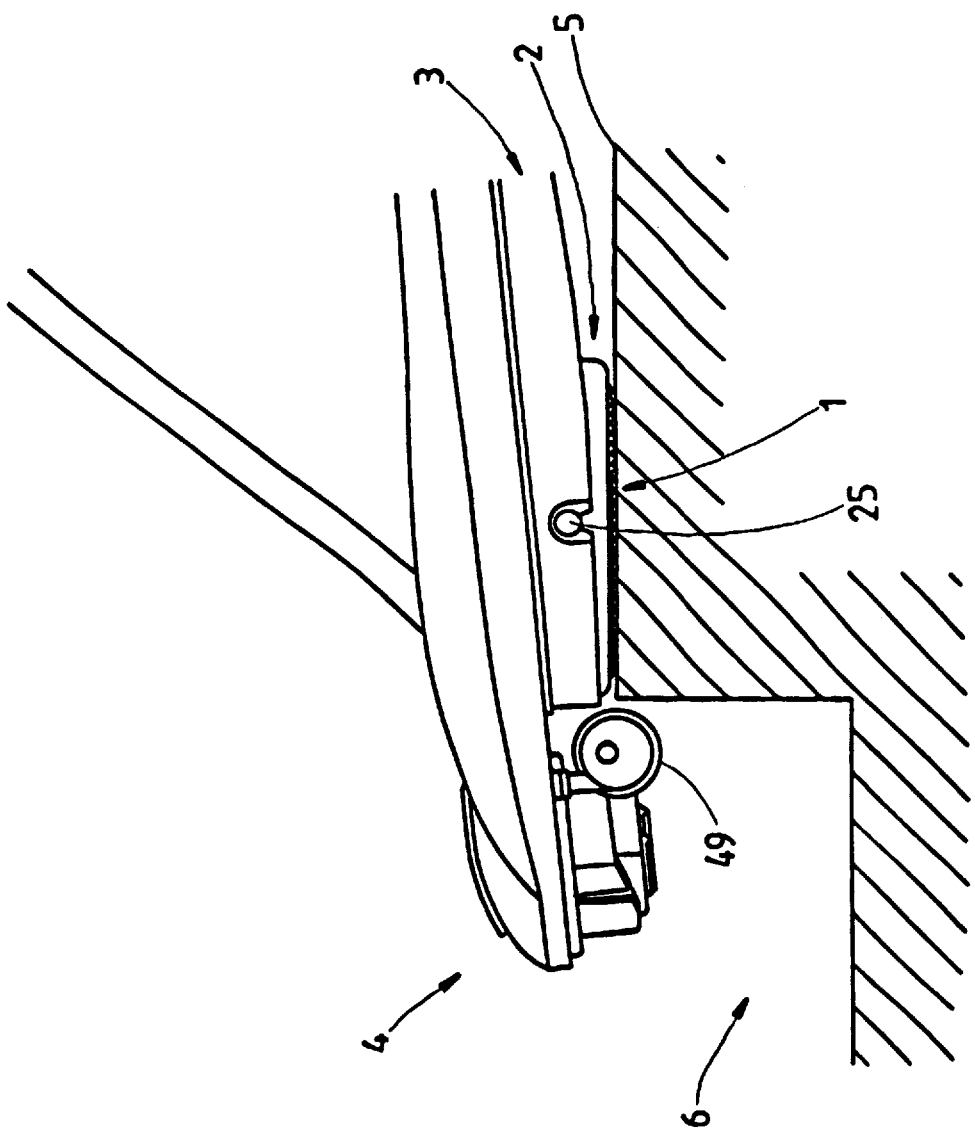
FIG. 7 is a schematic view showing practising of the present invention.

Referring to FIG. 7, when a roller 49 rushes out of a ground surface 5 to be suspended in the air in a stair way 6, the chassis 4 is tilted, however, the skid-proof pad seat 2 automatically adjusts its angular position to parallel to the ground surface 5 by means of the protruding axles 25 and the axle holes 30, the contact area of the skid-proof pad 1 and the ground surface 5 is a whole plane which has better friction capability than a linear contact area of the prior art, so that the baby stroller can be prevented from further dropping.

In conclusion, the angular auto-adjustive skid-proof pad system of the present invention on a baby stroller providing the function of skid-proof and braking when any roller of the baby stroller rushes out of a ground surface to be suspended in the air in a stair way, and especially providing a friction contact plane capable of automatical adjusting angular positions of the skid-proof pads to be constantly parallel to the ground surface, can effectively prevent the baby stroller from the danger of falling down stairs, this mechanism with such function has never existed in the markets or been published, thus the present invention is provided with improveness and practicability, therefore,

What I claim as new and desire to be secured by Letters Patent of the United States are:

1. An angular auto-adjustive skid-resistant pad system on a baby stroller, which system is provided on the bottom of the chassis of the baby stroller, and is comprised of a plurality of skid-resistant pads, a plurality of skid-resistant pad seats and pairs of side plates, wherein, each of said skid-resistant pads is integrally assembled on one of said skid-resistant pad seats, and is provided on the surface thereof with a plurality of undulated plates, and is provided on the bottom thereof with a plurality of engaging members protruding downwardly;

each of said skid-resistant pad seats is provided thereon with a groove for receiving one of said skid-resistant pads, said groove is provided with a plurality of engaging slots for engagement with said engaging members of said one skid-resistant pad, and said skid-resistant pad seat is provided on either side thereof mutually oppositely with a protruding axle;

said side plates are provides thereon each with an axle hole which is provided on the top thereof with a reduced engaging neck;

by said members, said skid-resistant pads can be engaged with said skid-resistant pad seats, thus said skid-resistant pad seats can be pivotally mounted between said side plates by means of said protruding axles.

2. An angular auto-adjustive skid-resistant pad system on a baby stroller as in claim 1, wherein, said engaging members of said skid-resistant pads each is comprised of an extension portion and an enlarged end.

3. An angular auto-adjustive skid-resistant pad system on a baby stroller as in claim 1, wherein, said engaging slots each is provided with two opposite stop pieces.

4. An angular auto-adjustive skid-resistant pad system on a baby stroller as in claim 1, wherein, said side plates are integrally formed with said chassis of said baby stroller.

5. An angular auto-adjustive skid-resistant pad system on a baby stroller as in claim 1, wherein, said chassis is provided with a plurality of bracing sheets and elastic sheets for supporting said skid-resistant pad seats constantly in parallel positions to the ground surface.

6. An angular auto-adjustive skid-resistant pad system on a baby stroller as in claim 5, wherein, said elastic sheets are to be contacted by a plurality of internal sheets provided in said skid-resistant pad seats.

* * * * *